(12) United States Patent
Brueckner et al.

(10) Patent No.: US 7,605,284 B2
(45) Date of Patent: Oct. 20, 2009

(54) PROCESS FOR PREPARING ORGANICALLY MODIFIED POLYORGANOSILOXANES

(75) Inventors: Arndt Brueckner, Muelheim an der Ruhr (DE); Ingrid Eissmann, Gelsenkirchen (DE); Michael Ferenz, Essen (DE); Sascha Herrwerth, Essen (DE); Thomas Neumann, Bochum (DE)

(73) Assignee: Goldschmidt GmbH, Essen (DE)

( * ) Notice: Subject to any disclaimer, the term of this patent is extended or adjusted under 35 U.S.C. 154(b) by 520 days.

(21) Appl. No.: 11/553,238

(22) Filed: Oct. 26, 2006

(65) Prior Publication Data

US 2007/0100153 A1    May 3, 2007

(30) Foreign Application Priority Data

Oct. 29, 2005  (DE) .................. 10 2005 051 939

(51) Int. Cl.
*C07F 7/04*  (2006.01)
*C07F 7/08*  (2006.01)

(52) U.S. Cl. .................. 556/470; 556/482

(58) Field of Classification Search .......... 556/470, 556/482

See application file for complete search history.

(56) References Cited

U.S. PATENT DOCUMENTS

| | | | | |
|---|---|---|---|---|
| 3,846,463 A | * | 11/1974 | Nagai et al. ........ | 556/443 |
| 5,047,526 A | * | 9/1991 | Yamamoto ........ | 540/200 |
| 5,084,589 A | * | 1/1992 | Legrow ........ | 556/470 |
| 5,103,034 A | * | 4/1992 | Cho et al. ........ | 556/470 |
| 5,147,965 A | | 9/1992 | Ichinohe et al. ........ | 528/12 |
| 6,284,908 B1 | | 9/2001 | Loy et al. ........ | 556/467 |

FOREIGN PATENT DOCUMENTS

| | | |
|---|---|---|
| DE | 103 12 636 A1 | 9/2004 |
| DE | 103 59 764 A1 | 7/2005 |
| EP | 0 475 440 A2 | 3/1992 |
| EP | 0 492 662 A2 | 7/1992 |
| JP | 48-19941 | 3/1973 |

OTHER PUBLICATIONS

Boyer et al, Heterogeneous Catalysis in the Presence of Salts and Without Solvent, Journal of Organometallic Chemistry, 157 (1978) 153-162.
Chauhan et al, A Catalytic Route to Grafted Silicones, Organometallics 2001, 20, 2725-2729.
Jerry March, Advanced Organic Chemistry, Reactions, Mechanisms, and Structure, pp. 1016-1049, 2001.
Houben-Weyl, Methoden der organischen Chemie, Stickstoff-Verbindungen I, 116 Tabellen, pp. 1032-1034, 1966.

* cited by examiner

*Primary Examiner*—Porfirio Nazario Gonzalez
(74) *Attorney, Agent, or Firm*—Frommer Lawrence & Haug LLP

(57) ABSTRACT

The invention relates to a process for the dehydrogenative condensation of alcohols and siloxanes which have at least one hydrogen atom bound to a silicon atom in the molecule, wherein at least one quaternary ammonium hydroxide is used as effective catalyst in this reaction.

20 Claims, No Drawings

PROCESS FOR PREPARING ORGANICALLY MODIFIED POLYORGANOSILOXANES

This application claims benefit under 35 U.S.C. 119(a) of German patent application DE 10 2005 051 939.3, filed on 29 Oct. 2005.

Any foregoing applications, including German patent application DE 10 2005 051 939.3, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to a process for the reaction of polyorganosiloxanes, in which a hydrogen atom bound to the silicon is replaced by an alkoxide radical.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Owing to their unique properties such as water repulsion, interfacial activity, thermal stability, etc., siloxanes are used in numerous industrial applications. These include the stabilization of polyurethane foams, used as emulsifiers, in release coatings and many others.

However, to be able to utilize the unique properties of siloxanes in industrial applications, it is usually necessary to modify the siloxane by means of organic groups, since the pure silicone is generally incompatible with aqueous or organic formulations.

To bond organic groups to a siloxane, there are in principle two different types of bonding available. In the first case, a carbon atom is bound directly to a silicon atom (SiC linkage), while in the second case a carbon atom is bound to the silicon atom via an oxygen atom (SiOC linkage). The SiC linkage usually results from a hydrosilylation reaction, while a number of methods are available for forming an SiOC linkage. Classically, SiOC linkages are formed by reaction of a siloxane having a leaving group (e.g. halogen) bound to the silicon atom and an alcohol. Chlorosiloxanes are particularly widespread for this type of reaction. However, chlorosiloxanes are difficult to handle since they are extremely reactive. The use of chlorosiloxanes also has the disadvantage that the hydrogen chloride formed in the reaction restricts handling to corrosion-resistant plants and leads to ecological problems. In addition, organic chlorine compounds can be formed in the presence of chlorosiloxanes and alcohols and these are undesirable for toxicological reasons. Furthermore, it is not easy to achieve a quantitative conversion in the reaction of a chlorosiloxane with an alcohol. It is frequently necessary to use bases which serve as HCl scavengers in order to achieve good yields. The use of these bases results in the formation of large amounts of salt waste whose disposal presents problems on an industrial scale.

An alternative to this process is to react alcohols with siloxanes in which hydrogen is bound directly to the silicon atom (hydrogensiloxanes). Under suitable conditions, this results only in elimination of hydrogen on formation of the SiOC bond, and no salt waste from the reaction of liberated HCl and base is obtained. This dehydrogenative condensation proceeds only in the presence of a catalyst. U.S. Pat. No. 5,147,965 refers to a process which is described in the Japanese patent publication 480-19941 and in which a hydrogensiloxane is reacted with an alcohol with addition of alkali metal hydroxides or alkali metal alkoxides. A disadvantage of this process is that the catalysts have to be neutralized after the reaction is complete and although the resulting amount of salt waste is lower than that in the chlorosiloxane process, it nevertheless has to be filtered off, which costs money.

EP-A-0 475 440 (U.S. Pat. No. 5,147,965) describes a process in which hydrogensiloxanes are reacted with an alcohol with addition of an organic acid in the presence of a Pt salt. It is absolutely necessary to use both large amounts of organic acid (from 0.1 to 1 mol based on alcohol), toluene as solvent and a platinum salt for the reaction. Since both toluene and the organic acid are undesirable in the end product, these have to be separated off again after the reaction is complete. Platinum salts are not only expensive but are also not completely unproblematical from a physiological point of view. Particularly in the cosmetics industry, there is a desire for products which are free of platinum.

The process described in J. Boyer, R. J. P. Corriu, R. Perz, C. Reye, *J. Organomet. Chem.* 1978, 157, 153-162, does not require the use of heavy metals. Here, salts such as potassium tartrate, phthalate or formate are used as heterogeneous catalysts. However, the reactions require the use of equimolar amounts of these salts (based on SiH units) and occur successfully only at high temperatures of about 180° C. Both the drastic conditions and the large amounts of salt necessary, once again make the reaction unattractive for the industrial scale.

The patent application DE 103 12 634.1, which is not a prior publication, describes a process which makes the preparation of organically modified polyorganosiloxanes by reaction of hydrogen siloxanes with alcohols possible at relatively low temperatures and makes do with a catalytic amount of a mixture of an organic acid and its salt. However, here too the catalyst mixture has to be removed from the reaction mixture by means of a costly filtration.

The prior art discloses two further processes in which the dehydrogenative condensation of hydrogensiloxanes and alcohols is not catalyzed by carboxylic acids and/or their salts: Chauhan et al. describe the use of $RhCl(PPh_3)_3$ for the dehydrogenative condensation of hydrogensiloxanes and alcohols (B. P. S. Chauhan et al., Organometallics 2001, 20, 2725-2729). A disadvantage of this process is the very large amounts of the expensive and toxic rhodium catalyst which are used and can be separated off only at considerable cost.

In the patent applications DE 103 12 636 (U.S. Patent Application Publication 2004-186260) and DE 103 59 764 (U.S. Patent Application Publication 2005-136269), which are not prior publications, boron-containing catalysts are used for the dehydrogenative condensation of hydrogensiloxanes and alcohols. However, the procedure described has the disadvantage that, inter alia, the catalysts are comparatively expensive, so that the products obtained can sometimes not be prepared economically. In some applications, the toxicity and the unsatisfactory biodegradability of the boron-containing compound remaining in the product can be of particular importance.

There is therefore a need to find a technically simple and economical process which makes it possible to couple siloxanes with alcohols without the presence of chlorine and, optionally, without the presence of solvents and in which the catalyst can be removed from the reaction product in a relatively simple way after the reaction is complete.

In the efforts made to overcome the disadvantages of the prior art of the dehydrogenative condensation and to provide a process which makes an advantageous alternative preparation of modified siloxanes possible, it was surprisingly found that this objective can be achieved by reaction of a hydrogensiloxane with an alcohol in the presence of a catalytic system comprising at least one quaternary ammonium hydroxide.

Tetraalkylammonium hydroxides are known as catalysts for the equilibration of polyorganosiloxanes. This type of reaction does not involve a dehydrogenative condensation of hydrogensiloxanes and an alcohol, but instead a breaking and reformation of Si—O—Si linkages which are fundamentally different from the Si—O—C linkages with which the invention is concerned. Thus, for example, EP-A-0 492 662 discloses a process in which tetramethylammonium hydroxide catalyzes the polymerization of cyclic siloxanes.

U.S. Pat. No. 6,284,908 describes a process in which tetraalkylammonium hydroxides, alkali metal hydroxide or alkaline earth metal hydroxides are used as catalysts for the disproportionation of hydrogensiloxanes to form polysilsesquioxanes and oligohydridosilanes. Within minutes, gels or gel-like solids are formed and volatile silanes are liberated. Surprisingly, the reaction described in this patent, i.e. the solidification of the reaction mixture associated with the disproportionation, can be suppressed under the conditions of the present invention, namely the presence of alcohols and the use of significantly smaller amounts of catalyst, and the fundamentally different alcohol-modified siloxanes can be obtained in high yields instead of the polysilsesquioxanes and oligohydridosilanes.

The invention accordingly provides a process for the dehydrogenative condensation of alcohols and siloxanes which have at least one hydrogen atom bound to a silicon atom in the molecule, wherein at least one quaternary ammonium hydroxide is used as catalyst, optionally in admixture with further catalysts according to the invention or catalysts which are not according to the invention.

In one embodiment of the invention, the catalysts according to the invention are compounds of the general formula (I)

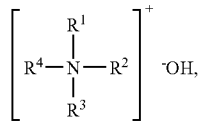

where
$R^1$, $R^2$, $R^3$ and $R^4$ are, independently of one another, substituted or unsubstituted, branched or unbranched, hydrocarbon radicals which have carbon atoms in the range selected from the group consisting of from 1 to 20 carbon atoms, from 1 to 10 carbon atoms, from 1 to 4 carbon atoms, and 1 carbon atom, and may contain heteroatoms and may contain further functional groups; with two radicals $R^1$ to $R^4$ together being able to form a five- or six-membered ring which may contain heteroatoms, may be substituted and may contain multiple bonds.

In another embodiment of the invention catalysts are selected from the group consisting of:

tetramethylammonium hydroxide, tetraethylammonium hydroxide, tetrapropylammonium hydroxide, tetraisopropylammonium hydroxide, tetrabutylammonium hydroxide, tetraisobutylammonium hydroxide, tetra-tert-butylammonium hydroxide, tetrapentylammonium hydroxide, tetrahexylammonium hydroxide, tetraheptylammonium hydroxide, tetraoctylammonium hydroxide, benzyltrimethylammonium hydroxide, diethyldimethylammonium hydroxide, methyltripropylammonium hydroxide, N,N,N,N',N',N'-hexabutylhexamethylenediammonium hydroxide, tetrakis(2-hydroxyethyl)ammonium hydroxide, tributylmethylammonium hydroxide, triethylmethylammonium hydroxide, trimethylphenylammonium hydroxide, (2-hydroxyethyl)trimethylammonium hydroxide, (2-hydroxyethyl)triethylammonium hydroxide, (2-hydroxyethyl)tripropylammonium hydroxide, (2-hydroxyethyl)tributylammonium hydroxide, hexamethonium hydroxide, dimethyldiethanolammonium hydroxide and mixtures thereof, in each case as an anhydrous solid, as a solid in various degrees of hydration, as a solution in aqueous or nonaqueous solvents or mixtures of solvents, adsorbed or covalently bound to support substances or as a dispersion.

In one embodiment of the catalyst, the catalyst is tetramethylammonium hydroxide, as a solid in the form of the pentahydrate or as a solution in water, alcohols, polyethers or mixtures thereof.

In general, the catalyst can be used as a homogeneous or heterogeneous catalyst. Likewise, a homogenized heterogeneous catalysis or a heterogenized homogeneous catalysis is possible within the scope of the invention.

In another embodiment of the invention, wherein after completion of dehydrogenative condensation the quaternary ammonium hydroxide compounds are decomposed up to 90% by weight based on the total weight of the catalyst within 10 hours of heating at temperatures up to 200° C. optionally under >5 mbar reduced pressure.

One embodiment of the hydrogensiloxanes are polyorganosiloxanes of the general formula (II)

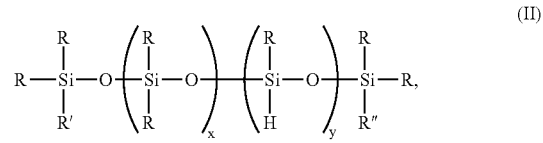

where the radicals
R are one or more identical or different radicals selected from among linear or branched, saturated, monounsaturated or multiply unsaturated alkyl, aryl, alkylaryl or arylalkyl radicals having carbon atoms in the range selected from the group consisting of from 1 to 40, and from 1 to 20 carbon atoms, haloalkyl groups having from 1 to 20 carbon atoms, siloxy groups and triorganosiloxy groups,
R' and R" are each, independently of one another, H or R,
x is an integer selected from the range consisting of from 0 to 600 and from 0 to 200,
y is an integer selected from the range consisting of from 0 to 100, from 0 to 50, and <40, with the proviso that at least one hydrogen atom bound to a silicon atom is present in the molecule.

In one embodiment of the invention, the branched or unbranched, cyclic or acyclic polyorganosiloxanes used are purely terminal, i.e. Si—H groups are located only on the head groups of the polysiloxane chain; purely lateral, i.e. Si—H groups are located only in the interior but not on the head groups of the polysiloxane chain; however, they can also be of a mixed form between these two cases.

In another embodiment of the invention, the polyorganosiloxanes are selected from the group consisting of comb-like, α-monosubstituted α,ω-disubstituted and mixed polydimethylhydrogensiloxanes of the general formula (II).

In the process of the invention, any organic compound having alcoholic hydroxyl groups may be used, which includes but is not limited to monoalcohols, diols, triols, polyols, amino alcohols and, for example, hydroxycarboxylic acids and their respective derivatives, linear or branched, saturated, monounsaturated or polyunsaturated, aromatic, fluorinated or perfluorinated, mono(meth)acrylated or poly(meth)acrylated, aliphatic-aromatic, optionally further functionalized monoalcohols or polyalcohols, polyether monoalcohols or polyalcohols, amino alcohols, primary amino alcohols, N-alkyl alcohols, arylamino-$(C_2H_4O)_n$ alcohols, arylamino-$(C_3H_6O)_n$ alcohols in which n and m are each from 1 to 50, N-alkylamino or arylamino alcohols, polyether alcohols bearing amino groups which are obtainable, for example, under the name "Jeffamine" from Huntsman, hydroxyalkylpiperazines, hydroxyalkylpiperidines and hydroxyalkylpyrrolidines, trialkylalkanolammonium salts, dialkyldialkanolammonium salts, dialkylbis[hydroxy(oligoalkoxy)] ammonium salts, mercapto alcohols, S-alkyl-, aryl-thio ethylene oxide-, propylene oxide-alcohols, S-alkyl alcohols or S-arylthio alcohols, hydroxyalkylphosphonium salts, hydroxyarylphosphonium salts. In the case of two or more alcohols used in the process of the invention, they can be reacted simultaneously or in any order.

In one embodiment of the alcohols, the alcohols are selected from the group consisting of is given to methanol, ethanol, fatty alcohols having from 6 to 22 carbon atoms, e.g. hexyl alcohol, octyl alcohol, decyl alcohol, lauryl alcohol, myristyl alcohol, cetyl alcohol, oleyl alcohol, arachidyl alcohol, stearyl alcohol, behenyl alcohol, amino alcohols and also polyether alcohols comprising propylene oxide or ethylene oxide and started, for example, with butyl alcohol, allyl alcohol or nonyl phenol, and also polyether alcohols comprising styrene oxide and/or butylene oxide.

To suppress the secondary reaction of Si—H to Si—OH, it is advantageous to dry the alcohols used before use, particularly when using polyether alcohols. This can be effected by known methods, for example by means of desiccants or vacuum distillation. When aqueous solutions of the catalyst are used, water is introduced again into the reaction system, but only in very small amounts which can be disregarded.

The molar ratio of SiH groups to alcohol groups can be chosen freely. Partially substituted polyorganosiloxanes which have not only substituted Si—O—C units but also unreacted Si(H) units can thus readily be obtained by the process of the invention, and these can, if desired, be reacted further with other compounds, for example in a hydrosilylation reaction. For this purpose, the molar ratio of SiH groups to alcohol groups is preferably set in the range from 1:0.1 to 1:0.99 molar equivalent.

To achieve complete reaction of the Si(H) units, the alcohol or a mixture of various alcohols is particularly preferably used in a 10% excess in the process of the invention.

The alcohol or a mixture of various alcohols can be initially charged together with the hydrogensiloxane or a mixture of various hydrogensiloxanes. As an alternative, the hydrogensiloxane or a mixture of various hydrogensiloxanes can be initially charged and the alcohol or a mixture of various alcohols can be added dropwise. Preference is given to a process in which the alcohol or a mixture of various alcohols is initially charged and the hydrogensiloxane or a mixture of various hydrogensiloxanes is added dropwise.

The dehydrogenative condensation (coupling) can be promoted by addition of a weak acid. For example, diammonium phosphate (DAP; from 100 to 500 ppm) improves the reaction (see Example 2). However, it has also been found that the process of the invention can be carried out in neutral or alkaline media. For example, polyethers prepared in the presence of alkaline catalysts can be successfully used without subsequent neutralization in the process of the invention.

The process of the invention is advantageously carried out without solvents, which is important from economic and ecological points of view, in particular for industrial implementation.

The process of the invention differs from previous processes for making organically modified polyorganosiloxanes in a number of ways:

In contrast to other processes which start out from chlorosiloxanes, it is possible to prepare polyorganosiloxanes which are not contaminated with hydrochloric acid originating from the substitution reaction, hydrogen chloride or chlorides corresponding to their neutralization products according to the invention. This makes further processing or work-up considerably easier.

Furthermore, the process of the invention differs from the process described in the patent application DE 103 12 634, which is not a prior publication, in that the reaction times are significantly shorter.

In particular, the process of the invention differs from the processes of the prior art for the dehydrogenative condensation of alcohols with SiH-functional siloxanes in that the catalysts used according to the invention can easily be decomposed by increasing the temperature after conclusion of the reaction. The reaction mixture is preferably heated to from 130 to 160° C. for from 1 to 2 hours. Here, tetramethylammonium hydroxide is dissociated into the compounds trimethylamine and methanol which distil off from the reaction mixture at this temperature.

Quaternary ammonium salts whose substituents have a hydrogen atom in the β position undergo a thermal decomposition which is well known as the Hofmann elimination (see, for example, Jerry March, Advanced Organic Chemistry, 4th Edition, Wiley, page 1016 ff or Houben-Weyl, Methoden der Organischen Chemie, E16a, p. 1032). This forms the corresponding amines and a corresponding olefin which, optionally aided by use of reduced pressure, are given off from the reaction mixture.

Catalyst removal is desirable because catalysts of the prior art can have an adverse effect on the product, for example during storage of the product. Removal of the catalyst by filtration, as is necessary, for example, when a catalytical mixture comprising an acid and a carboxylic acid salt is used, is dispensed with. Likewise, neutralization of the reaction mixture as is necessary when alkali metal hydroxides or alkaline earth metal hydroxides are used as catalysts or in the reaction of chlorosiloxanes and costly removal of the resulting salts by filtration are dispensed with.

A further substantial advantage is associated with the ability of the catalyst to be decomposed by increasing the temperature: should the reaction proceed too vigorously, the resulting heat evolved can serve to inactivate the catalyst and thus stop the reaction. This inherent safety of the process of the invention is of particular interest for reaction batches on an industrial scale.

The process of the invention has provided a technically simple way of preparing polyorganosiloxanes which comprise terminal and/or lateral Si—O—C-bonded radicals and are free of the abovementioned impurities, in particular residues of hydrochloric acid and neutralization products containing chloride, heavy metals as occur in catalysts of the prior art, organic acids and their salts which would have to be filtered off or boron-containing compounds.

The organopolysiloxanes prepared according to the invention can be used for the finishing of textiles, as additives for plastics, surface coating compositions, printing inks and for cosmetic formulations or in the building paints sector and/or as stabilizers for polyurethane foam.

EXAMPLES

General:

Siloxanes:

The siloxanes used in these examples were generally purely terminal siloxanes, for example: $M'-O-D_{13}-M'$ where $M'=(CH_3)_2SiH$, $D=(CH_3)_2SiO$; or purely lateral siloxanes, for example: $M-O-D_8-D'10-M$ where $M=(CH_3)_3Si$, $D'=(CH_3)SiH$.

Alcohols:

The polyether alcohols were freed of all volatile constituents by distillation under reduced pressure before use. Before the distillation, diammonium phosphate (DAP; 500 ppm) was optionally added. A 10 mol % excess of alcohol was always employed.

Catalyst:

The reactions described in Examples 1 to 11 were catalyzed by the preferred catalyst tetramethylammonium hydroxide*5 water (TMAH*5H$_2$O). The catalyst was used as commercially available, i.e. without further treatment and purification, and was employed as a 1% strength solution in the alcohol to be reacted, as a 60-70% strength aqueous solution or as a solid. Example 12 describes the use of tetrabutylammonium hydroxide*30 water (TBAH*30H$_2$O) as catalyst. This catalyst was used as commercially available, i.e. without further treatment and purification, and was employed as a solid. Example 13 describes the use of benzyltrimethylammonium hydroxide as catalyst. This catalyst was used as commercially available, i.e. without further treatment and purification, and was employed as a 20% strength aqueous solution.

Procedure for the reaction:

All reactions were carried out under an inert atmosphere. The reaction formed hydrogen which was discharged via a bubble counter.

Work-up:

Unless indicated otherwise, the following standard work-up was chosen: after the reaction was complete, the reaction mixture was stirred for 1 hour under reduced pressure, preferably from 10 to 20 mbar, and at a temperature of 150° C.

Analyses:

The conversion was determined by determination of the remaining SiH functions by means of a gas-volumetric hydrogen determination [conversion in %; SiH value in eq/kg of test substance].

The OH number was determined by reaction of phthalic anhydride with free hydroxyl groups. The free acid was back-titrated with a base solution [OH number reported in mg of KOH/g of test substance]. The presence of the appropriate Si—O—C linkage was demonstrated in each case by examination of the reaction product by $^{29}$Si-NMR spectroscopy.

Reactions of terminal and lateral hydrogensiloxanes with alcohols in a dehydrogenative hydrosilylation:

The invention is further described by the following non-limiting examples which further illustrate the invention, and are not intended, nor should they be interpreted to, limit the scope of the invention.

Example 1

Reaction of $M'-O-D_{13}-M'$ siloxane with a butyl alcohol-initiated polyether using tetramethylammonium hydroxide dissolved in the polyether:

75 g of $M'-O-D_{13}-M'$ siloxane (SiH value 1.91 eq/kg) were reacted with 307 g of a butyl alcohol-initiated, purely PO-containing polyether (mean molar mass of 1960 g/mol) having an OH number of 28.6. The polyether was used in an excess of 10% by mass. 277 g of polyether were initially charged, heated to 100° C. and admixed with a solution of 0.31 g of tetramethylammonium hydroxide*5 water in 30 g of polyether, corresponding to 800 ppm of catalyst based on the total batch. The siloxane was added dropwise at 100° C. This resulted in formation of a gas which was discharged in a controlled fashion. The mixture was stirred for another 0.5 hour at 100° C. The gas-volumetric determination of hydrogen indicated a quantitative conversion. The reaction product was worked up as described above.

Example 2

Reaction of $M'-O-D_{13}-M'$ siloxane with a butyl alcohol-initiated polyether using tetramethylammonium hydroxide and diammonium phosphate:

81 g of $M'-O-D_{13}-M'$ siloxane (SiH value 1.77 eq/kg) were reacted with 307 g of a butyl alcohol-initiated, purely PO-containing polyether (mean molar mass of 1960 g/mol) which had an OH number of 28.6 and had previously been admixed with 0.19 g of diammonium phosphate, corresponding to 500 ppm based on the total batch. The polyether was used in an excess of 10% by mass. 288 g of diammonium phosphate-containing polyether was initially charged, heated to 100° C. and admixed with a solution of 0.19 g of tetramethylammonium hydroxide*5 water in 19 g of polyether, corresponding to 500 ppm of catalyst based on the total batch. The siloxane was added dropwise at 100° C. This resulted in formation of a gas which was discharged in a controlled fashion. The mixture was stirred for another 1 hour at 100° C. The gas-volumetric determination of hydrogen indicated a quantitative conversion. The reaction product was worked up as described above.

In an analogous batch again using 500 ppm of tetramethylammonium hydroxide*5 water but without addition of phosphate, a conversion of only 66% was able to be achieved even after stirring for 2 hours at 100° C. This clearly demonstrates the promotion of the dehydrogenative condensation according to the invention by addition of a weak acid.

Example 3

Reaction of $M'-O-D_{13}-M'$ siloxane with a butyl alcohol-initiated polyether using an aqueous solution of tetramethylammonium hydroxide:

41 g of $M'-O-D_{13}-M'$ siloxane (SiH value 1.77 eq/kg) were reacted with 154 g of a butyl alcohol-initiated, purely PO-containing polyether (mean molar mass of 1960 g/mol) having an OH number of 28.6. The polyether was used in an excess of 10% by mass. The polyether was initially charged, heated to 100° C. and admixed with a 70% strength aqueous solution of 0.19 g of tetramethylammonium hydroxide*5 water, corresponding to 1000 ppm of catalyst based on the total batch. The siloxane was added dropwise at 100° C. This resulted in formation of a gas which was discharged in a controlled fashion. During the further stirring of the mixture for 2 hours, the temperature was increased to 120° C. The gas-volumetric determination of hydrogen indicated a quantitative conversion. The reaction product was worked up as described above.

Example 4

Reaction of M-O-$D_8$-$D'_{10}$-M siloxane with a nonylphenol-initiated polyether using tetramethylammonium hydroxide dissolved in the polyether:

50 g of M-O-$D_8$-$D'_{10}$-M siloxane (SiH value 7.48 eq/kg) were reacted with 165 g of a nonylphenol-initiated, purely EO-containing polyether (mean molar mass of 400 g/mol) having an OH number of 143. The polyether was used in an excess of 10% by mass. 160 g of polyether were initially charged, heated to 100° C. and admixed with a solution of 50 mg of tetramethylammonium hydroxide*5 water in 5 g of polyether, corresponding to 233 ppm of catalyst based on the total batch. The siloxane was added dropwise at a temperature of from 80 to 88° C. This resulted in formation of a gas which was discharged in a controlled fashion. The mixture was stirred for another 0.5 hour in this temperature range. The gas-volumetric determination of hydrogen indicated a quantitative conversion. The reaction product was worked up as described above.

Example 5

Reaction of M'-O-$D_8$-M' siloxane with an allyl alcohol-initiated polyether using tetramethylammonium hydroxide:

43 g of M'-O-$D_8$-M' siloxane (SiH value 3.0 eq/kg) were reacted with 59 g of an allyl alcohol-initiated, purely EO-containing polyether (mean molar mass of 410 g/mol) having an OH number of 137. The polyether was used in an excess of 10% by mass. The polyether was admixed with 0.102 g of tetramethylammonium hydroxide*5 water. This mixture was heated to 100° C. and the siloxane was added dropwise, with the reaction temperature rising to 110° C. This resulted in formation of a gas which was discharged in a controlled fashion. The mixture was stirred for another 0.5 hour at from 100 to 110° C. The gas-volumetric determination of hydrogen indicated a quantitative conversion. The clear reaction product was worked up as described above.

Example 6

Reaction of M-O-$D_{21}$-$D'_5$-M siloxane with an allyl alcohol-initiated polyether using tetramethylammonium hydroxide:

48 g of M-O-$D_{21}$-$D'_5$-M siloxane (SiH value 2.5 eq/kg) were reacted with 54 g of an allyl alcohol-initiated, purely EO-containing polyether (mean molar mass of 410 g/mol) having an OH number of 137. The polyether was used in an excess of 10% by mass. The polyether was admixed with 0.102 g of tetramethylammonium hydroxide*5 water. This mixture was heated to 100° C. and the siloxane was added dropwise, with the reaction temperature rising to 105° C. This resulted in formation of a gas which was discharged in a controlled fashion. The mixture was stirred for another 0.5 hour at from 100 to 105° C. The gas-volumetric determination of hydrogen indicated a quantitative conversion. The clear reaction product was worked up as described above.

Example 7

Reaction of M-O-$D_{21}$-$D'_5$-M siloxane with butanediol monovinyl ether using tetramethylammonium hydroxide:

80 g of M-O-$D_{21}$-$D'_5$-M siloxane (SiH value 2.5 eq/kg) were reacted with 25.6 g of butanediol monovinyl ether. The alcohol was admixed with 0.106 g of tetramethylammonium hydroxide*5 water. This mixture was heated to 100° C. and the siloxane was added dropwise, with the reaction temperature rising to 108° C. This resulted in formation of a gas which was discharged in a controlled fashion. The mixture was stirred for another 0.5 hour at 100° C. The gas-volumetric determination of hydrogen indicated a quantitative conversion. The clear reaction product was worked up as described above.

Example 8

Reaction of M'-O-$D_{30}$-M' siloxane with stearyl alcohol using an aqueous solution of tetramethylammonium hydroxide:

75 g of M'-O-$D_{30}$-M' siloxane (SiH value 0.85 eq/kg) were reacted with 19 g of stearyl alcohol. The alcohol was initially charged, heated to 100° C. and admixed with a 60% strength aqueous solution of 94 mg of tetramethylammonium hydroxide*5 water, corresponding to 1000 ppm of catalyst based on the total batch. The siloxane was added dropwise at 100° C. This resulted in formation of a gas which was discharged in a controlled fashion. The mixture was stirred for another 1 hour at 100° C. The gas-volumetric determination of hydrogen indicated a quantitative conversion. The reaction product, which was colorless and solid at room temperature, was worked up as described above.

Example 9

Reaction of M-O-$D_{21}$-$D'_5$-M siloxane with stearyl alcohol using an aqueous solution of tetramethylammonium hydroxide:

40 g of M-O-$D_{21}$-$D'_5$-M siloxane (SiH value 2.52 eq/kg) were reacted with 30 g of stearyl alcohol. The alcohol was initially charged, heated to 100° C. and admixed with a 60% strength aqueous solution of 70 mg of tetramethylammonium hydroxide*5 water, corresponding to 1000 ppm of catalyst based on the total batch. The siloxane was added dropwise at 100° C. This resulted in formation of a gas which was discharged in a controlled fashion. The mixture was stirred for another 1 hour at 100° C. The gas-volumetric determination of hydrogen indicated a quantitative conversion. The reaction product, which was colorless and solid at room temperature, was worked up as described above.

Example 10

Reaction of M'-O-$D_{18}$-M' siloxane with ethanolamine using tetramethylammonium hydroxide:

109 g of M'-O-$D_{18}$-M' siloxane (SiH value 1.37 eq/kg) were reacted with 10 g of ethanolamine. The amino alcohol was initially charged, heated to 90° C. and, when a temperature of 50° C. had been reached, admixed with 0.12 g of tetramethylammonium hydroxide*5 water, corresponding to 1000 ppm of catalyst based on the total batch. The siloxane was added dropwise at 90° C. This resulted in formation of a gas which was discharged in a controlled fashion. The mixture was stirred for another 75 minutes at 90° C. The gas-volumetric determination of hydrogen indicated a quantitative conversion. Excess ethanolamine was removed under reduced pressure during the course of the decomposition of the catalyst in the above-described work-up.

Example 11

Reaction of M-O-D$_{21}$-D'$_5$-M siloxane with N,N-dimethylethanolamine using tetramethylammonium hydroxide:

81 g of M-O-D$_{21}$-D'$_5$-M siloxane (SiH value 2.52 eq/kg) were reacted with 20 g of N,N-dimethylethanolamine. The amino alcohol was initially charged, heated to 60° C. and, when a temperature of 50° C. had been reached, admixed with 20 mg of tetramethylammonium hydroxide*5 water, corresponding to 200 ppm of catalyst based on the total batch. The siloxane was added dropwise at 60° C. This resulted in formation of a gas which was discharged in a controlled fashion. The mixture was stirred for another 1 hour at 60° C. The gas-volumetric determination of hydrogen indicated a quantitative conversion. Excess N,N-dimethylethanolamine was removed under reduced pressure during the course of the decomposition of the catalyst in the above-described work-up.

Example 12

Reaction of M'-O-D$_{13}$-M' siloxane with stearyl alcohol using tetrabutylammonium hydroxide:

40.6 g of M'-O-D$_{13}$-M' siloxane (SiH value 1.82 eq/kg) were reacted with 22 g of stearyl alcohol. The alcohol and 120 mg of tetrabutylammonium hydroxide*30 water, corresponding to 2000 ppm of catalyst based on the total batch, were initially charged and the mixture was heated to 100° C. The siloxane was added dropwise at 100° C. This resulted in formation of a gas which was discharged in a controlled fashion. The mixture was stirred for another 8 hours at 100° C. The gas-volumetric determination of hydrogen indicated a quantitative conversion. The reaction product was worked up as described above.

Example 13

Reaction of M'-O-D$_{13}$-M' siloxane with stearyl alcohol using an aqueous solution of benzyltrimethylammonium hydroxide:

40.6 g of M'-O-D$_{13}$-M' siloxane (SiH value 1.82 eq/kg) were reacted with 22 g of stearyl alcohol. The alcohol was initially charged, heated to 100° C. and, when a temperature of 75° C. had been reached, admixed with 150 μl of a 20% strength aqueous solution of benzyltrimethylammonium hydroxide, corresponding to 1000 ppm of catalyst. The siloxane was added dropwise at 100° C. This resulted in formation of a gas which was discharged in a controlled fashion. The mixture was stirred at 100° C. for 4 hours. A further 75 μl of a 20% strength aqueous solution of benzyltrimethylammonium hydroxide, corresponding to 500 ppm of catalyst, were subsequently added and the mixture was stirred for another 1 hour. The gas-volumetric determination of hydrogen indicated a quantitative conversion. The reaction product was worked up as described above.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A process for the dehydrogenative condensation of alcohols and siloxanes which have at least one hydrogen atom bound to a silicon atom in the molecule, wherein at least one quaternary ammonium hydroxide is used as a catalyst for the process.

2. The process as claimed in claim 1, wherein at least one quaternary ammonium hydroxide is a compound of the general formula (I)

where
R$^1$, R$^2$, R$^3$ and R$^4$ are, independently of one another, substituted or unsubstituted branched or unbranched hydrocarbon radicals which have from 1 to 20 carbon atoms and may contain heteroatoms and may contain further functional groups; and two radicals R$^1$ to R$^4$ together can form a five- or six-membered ring which may contain heteroatoms, may be substituted and may contain multiple bonds.

3. The process as claimed in claim 1, wherein the quaternary ammonium hydroxide is selected from the group consisting of:
tetramethylammonium hydroxide,
tetraethylammonium hydroxide,
tetrapropylammonium hydroxide,
tetraisopropylammonium hydroxide,
tetrabutylammonium hydroxide,
tetraisobutylammonium hydroxide,
tetra-tert-butylammonium hydroxide,
tetrapentylammonium hydroxide,
tetrahexylammonium hydroxide,
tetraheptylammonium hydroxide,
tetraoctylammonium hydroxide,
benzyltrimethylammonium hydroxide,
diethyldimethylammonium hydroxide,
methyltripropylammonium hydroxide,
N,N,N,N',N',N'-hexabutylhexamethylenediammonium hydroxide,
tetrakis(2-hydroxyethyl)ammonium hydroxide,
tributylmethylammonium hydroxide,
triethylmethylammonium hydroxide,
trimethylphenylammonium hydroxide,
(2-hydroxyethyl)trimethylammonium hydroxide,
(2-hydroxyethyl)triethylammonium hydroxide,
(2-hydroxyethyl)tripropylammonium hydroxide,
(2-hydroxyethyl)tributylammonium hydroxide,
hexamethonium hydroxide,
dimethyldiethanolammonium hydroxide; and
mixtures thereof,
in each case as an anhydrous solid, as a solid in various degrees of hydration, as a solution in aqueous or non-aqueous solvents or mixtures of solvents, adsorbed or covalently bound to support substances or as a dispersion, are used as effective catalysts, optionally in admixture with further catalysts which is not a quaternary ammonium hydroxide.

4. The process as claimed in claim 1, wherein after completion of dehydrogenative condensation the quaternary ammonium hydroxide compounds are decomposed up to 90% based on the total weight of the catalyst within 10 hours of heating at temperatures up to 200° C. optionally under >5 mbar reduced pressure.

5. The process as claimed in claim 1, wherein the siloxanes are compounds of the general formula (II)

$$R-\underset{\underset{R'}{|}}{\overset{\overset{R}{|}}{Si}}-O-\left(\underset{\underset{R}{|}}{\overset{\overset{R}{|}}{Si}}-O\right)_x-\left(\underset{\underset{H}{|}}{\overset{\overset{R}{|}}{Si}}-O\right)_y-\underset{\underset{R''}{|}}{\overset{\overset{R}{|}}{Si}}-R, \quad (II)$$

where the radicals

R are one or more identical or different radicals selected from among linear or branched, saturated, monounsaturated or multiply unsaturated alkyl, aryl, alkylaryl or arylalkyl radicals having from 1 to 40 carbon atoms, haloalkyl groups having from 1 to 20 carbon atoms, siloxy groups and triorganosiloxy groups, R' and R" are each, independently of one another, H or R, x is an integer from 0 to 600, y is an integer from 0 to 100, with the proviso that at least one hydrogen atom bound to a silicon atom is present in the molecule, are used as siloxanes which have at least one hydrogen atom bound to a silicon atom in the molecule.

6. The process of claim 5, wherein:
x is an integer from 0 to 200,
y is an integer from 0 to 50.

7. The process of claim 6, wherein:
y is an integer <40.

8. The process as claimed in claim 1, wherein the alcohols are at least one compound selected from the group consisting of linear or branched, saturated, monounsaturated or polyunsaturated, aromatic, fluorinated or perfluorinated, mono(meth)acrylated or poly(meth)acrylated, aliphatic-aromatic, optionally further functionalized monoalcohols or polyalcohols, polyether monoalcohols or polyalcohols, amino alcohols, primary amino alcohols, N-alkyl alcohols, arylamino-$(C_2H_4O)_n$ alcohols, arylamino-$(C_2H_4O)_n$ alcohols in which n and m are each from 1 to 50, N-alkylamino or arylamino alcohols, polyether alcohols bearing amino groups, hydroxyalkylpiperazines, hydroxyalkylpiperidines and hydroxyalkylpyrrolidines, trialkylalkanolammonium salts, dialkyldialkanolammonium salts, dialkylbis[hydroxy(oligoalkoxy)] ammonium salts, mercapto alcohols, S-alkyl, arylthio ethylene oxide, propylene oxide alcohols, S-alkyl alcohols or arylthio alcohols, hydroxyalkylphosphonium salts, and hydroxyarylphosphonium salts.

9. The process as claimed in claim 1, wherein the alcohols are selected from the group consisting of:
methanol, ethanol, fatty alcohols having from 6 to 22 carbon atoms, polyether alcohols comprising styrene oxide and/or butylene oxide which have been functionalized with propylene oxide or ethylene oxide, polyether alcohols bearing amino groups, polyether alcohols containing styrene oxide and/or butylene oxide, amino alcohols and mixtures thereof.

10. The process as claimed in claim 1, wherein the catalyst is used as a homogeneous or heterogeneous catalyst or the reaction is carried out as a homogenized heterogeneous or heterogenized homogeneous catalysis.

11. The process as claimed in claim 1, wherein the molar ratio of SiH groups to alcohol groups is in the range from 1:0.1 to 1:0.99 molar equivalent.

12. The process as claimed in claim 1, wherein the alcohol is used in a 10% molar excess, based on SiH groups.

13. The process as claimed in claim 5, wherein polyorganosiloxanes selected from the group consisting of comb-like, α-monosubstituted, α,ω-disubstituted and mixed polydimethylhydrogensiloxanes of the general formula (II) are used.

14. The process as claimed in claim 1, wherein the polyorganosiloxanes are selected from the group consisting of compounds of the general formula (III):

$$M\text{-}O\text{-}D_x\text{-}D'_y\text{-}M \quad (III)$$

where

M is trialkylsilyl or trimethylsilyl, $D_x$ is (dialkylsilyloxy)$_x$ or (dimethylsilyloxy)$_x$, and $D'_y$ is $$-\underset{\underset{H}{|}}{\overset{\overset{CH_3}{|}}{Si}}-O- \quad \text{and}$$

x is an integer from 0 to 600, y is an integer from 0 to 100.

15. The process as claimed in claim 1, wherein the polyorganosiloxanes are selected from the group consisting of compounds of the general formula (IV):

$$M'\text{-}O\text{-}D_x\text{-}M' \quad (IV)$$

where

M' is dialkyl(hydrogen)silyl, or dimethylhydrogensilyl, and $D_x$ is (dialkylsilyloxy)$_x$, or (dimethylsilyloxy)$_x$, and x is an integer from 0 to 600.

16. The process as claimed in claim 1, wherein polyorganosiloxanes selected from the group consisting of compounds of the general formula (V):

$$M'\text{-}O\text{-}D_x\text{-}D'_y\text{-}M' \quad (V)$$

where

M' is dialkyl(hydrogen)silyl, or dimethylhydrogensilyl, $D_x$ is (dialkylsilyloxy)$_x$, or (dimethylsilyloxy)$_x$, and $D'_y$ is $$-\underset{\underset{H}{|}}{\overset{\overset{CH_3}{|}}{Si}}-O- \quad \text{and}$$

x is an integer from 0 to 600, y is an integer from 0 to 100, are used.

17. The process as claimed in claim 1, wherein the process is carried out in the absence of solvents.

18. The process of claim 3, wherein the alcohols are selected from the group consisting of:
methanol, ethanol, fatty alcohols having from 6 to 22 carbon atoms, polyether alcohols comprising styrene oxide and/or butylene oxide which have been functionalized with propylene oxide or ethylene oxide, polyether alcohols bearing amino groups, polyether alcohols containing styrene oxide and/or butylene oxide, amino alcohols and mixtures thereof;

the molar ratio of SiH groups to alcohol groups is in the range from 1:0.1 to 1:0.99 molar equivalent;

the reaction is carried out in the absence of solvents.

19. The process as claimed in claim 18, wherein the polyorganosiloxanes are selected from the group consisting of compounds of the general formula (III):

$$M\text{-}O\text{-}D_x\text{-}D'_y\text{-}M \quad (III)$$

where

M is trialkylsilyl, or trimethylsilyl, $D_x$ is (dialkylsilyloxy)$_x$, or (dimethylsilyloxy)$_x$, and $D'_y$ is

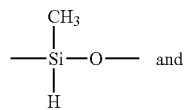 and x is an integer from 0 to 600, y is an integer from 0 to 100.

20. The process as claimed in claim 18, wherein the polyorganosiloxanes are selected from the group consisting of compounds of the general formula (IV):

$$M'\text{-}O\text{-}D_x\text{-}M' \quad (IV)$$

where

M' is dialkyl(hydrogen)silyl, or dimethylhydrogensilyl, and $D_x$ is (dialkylsilyloxy)$_x$, or (dimethylsilyloxy)$_x$, and x is an integer from 0 to 600.

* * * * *